(12) United States Patent
Hestetun et al.

(10) Patent No.: US 10,436,351 B2
(45) Date of Patent: Oct. 8, 2019

(54) METHOD FOR SUBSEA DEPLOYMENT OF DISCRETE LENGTHS OF FLEXIBLE JUMPER PIPES

(71) Applicant: Vetco Gray Scandinavia AS, Sandvika (NO)

(72) Inventors: Steinar Hestetun, Asker (NO); Alexander Fjeldly, Asker (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 15/773,223

(22) PCT Filed: Nov. 3, 2016

(86) PCT No.: PCT/EP2016/076537
§ 371 (c)(1),
(2) Date: May 3, 2018

(87) PCT Pub. No.: WO2017/076962
PCT Pub. Date: May 11, 2017

(65) Prior Publication Data
US 2018/0320799 A1 Nov. 8, 2018

(30) Foreign Application Priority Data
Nov. 4, 2015 (NO) .................................. 20151541

(51) Int. Cl.
*F16L 1/16* (2006.01)
*F16L 1/19* (2006.01)
(Continued)

(52) U.S. Cl.
CPC ............ *F16L 1/203* (2013.01); *E21B 19/002* (2013.01); *E21B 43/01* (2013.01); *F16L 1/15* (2013.01);
(Continued)

(58) Field of Classification Search
CPC ...... F16L 1/14; F16L 1/16; F16L 1/161; F16L 1/18; F16L 1/19; F16L 1/203
(Continued)

(56) References Cited

U.S. PATENT DOCUMENTS

| 4,742,792 A | 5/1988 | Mank et al. |
| 5,348,423 A | 9/1994 | Maloberti et al. |

(Continued)

FOREIGN PATENT DOCUMENTS

| AU | 2010/338125 A1 | 8/2012 |
| GB | 2 303 897 A | 3/1997 |

(Continued)

OTHER PUBLICATIONS

First Office Action and Search issued in connection with corresponding NO Application No. 20151541 dated Mar. 21, 2016.
(Continued)

*Primary Examiner* — Frederick L Lagman
(74) *Attorney, Agent, or Firm* — GE Global Patent Operation; Marc A. Vivenzio

(57) ABSTRACT

A method for deployment of discrete lengths of flexible jumper pipes for installation subsea is provided, comprising coupling the jumper pipes together end-to-end thus forming a flexible train of jumper pipes, and winding the train of jumper pipes on a drum suitable for transport to a deployment site by a pipe-laying vessel. On site, the train of jumper pipes is unreeled from the drum until the first jumper pipe is lowered into the sea, then the drum is halted and the trailing end of the first jumper pipe is detached from the leading end of the second jumper pipe in the train of jumper pipes. The trailing end of the first jumper pipe is shifted to a lowering wire, and the first jumper pipe is lowered to the sea bottom. The process is repeated until the discrete lengths of flexible jumper pipes are individually lowered into the sea.

10 Claims, 4 Drawing Sheets

Figure 1A:
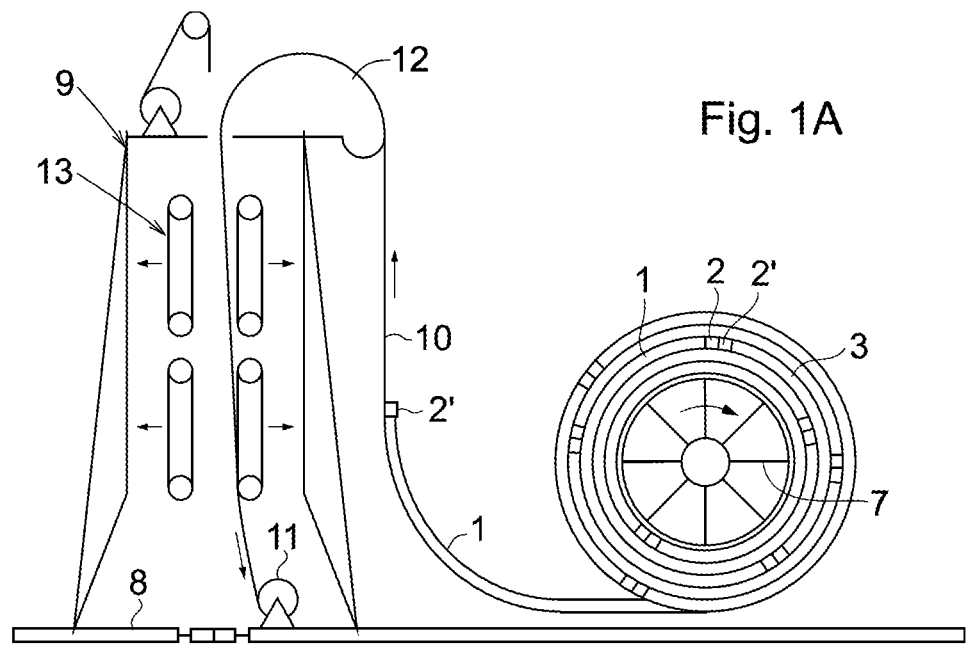

(51) Int. Cl.
*F16L 1/15* (2006.01)
*F16L 1/20* (2006.01)
*E21B 43/01* (2006.01)
*E21B 19/00* (2006.01)
*E21B 17/046* (2006.01)
*E21B 17/20* (2006.01)

(52) U.S. Cl.
CPC .............. *F16L 1/16* (2013.01); *F16L 1/19* (2013.01); *E21B 17/046* (2013.01); *E21B 17/20* (2013.01); *F16L 1/161* (2013.01)

(58) Field of Classification Search
USPC ..................................................... 405/168.3
See application file for complete search history.

(56) References Cited

U.S. PATENT DOCUMENTS

| | | | |
|---|---|---|---|
| 6,305,719 | B1 | 10/2001 | Smith, Jr. et al. |
| 2003/0145997 | A1 | 8/2003 | Langford et al. |
| 2008/0179064 | A1 | 7/2008 | Critsinelis |
| 2011/0262229 | A1* | 10/2011 | Tame ................. F16L 1/166 405/166 |
| 2012/0061504 | A1* | 3/2012 | Powell ................. B65H 49/24 242/564 |
| 2012/0269579 | A1* | 10/2012 | Ardavanis ............. B66C 13/02 405/166 |
| 2016/0003374 | A1* | 1/2016 | Roodenburg .......... B63B 35/03 405/166 |
| 2016/0153584 | A1* | 6/2016 | Maloberti ............. B66D 1/7447 405/166 |

FOREIGN PATENT DOCUMENTS

| WO | 96/00359 A1 | 1/1996 | |
|---|---|---|---|
| WO | WO-9600359 A1 * | 1/1996 | ............ E21B 19/22 |
| WO | 02/057675 A1 | 7/2002 | |
| WO | WO-2057675 A1 * | 7/2002 | |

OTHER PUBLICATIONS

Second Office Action issued in connection with corresponding NO Application No. 20151541 dated Nov. 21, 2016.

International Search Report and Written Opinion issued in connection with corresponding PCT Application No. PCT/EP2016/076537 dated Jan. 23, 2017.

International Preliminary Report on Patentability issued in connection with corresponding PCT Application No. PCT/EP2016/076537 dated May 8, 2018.

* cited by examiner

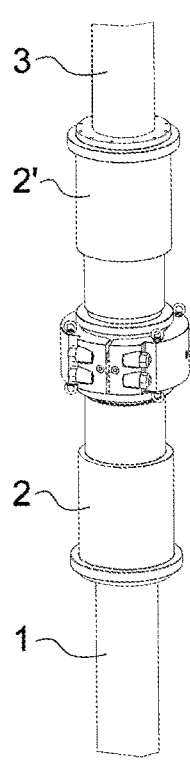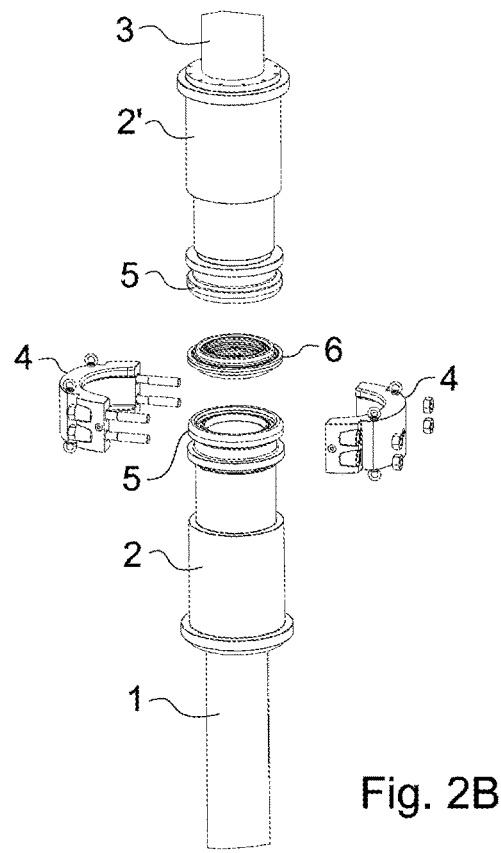
Fig. 2A    Fig. 2B
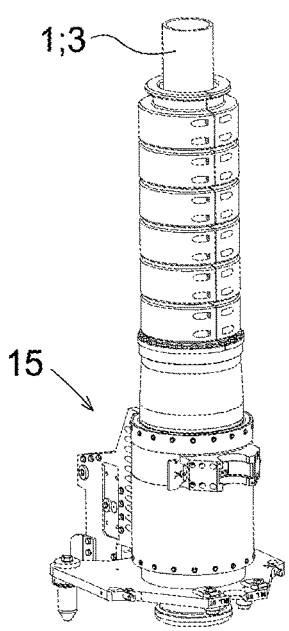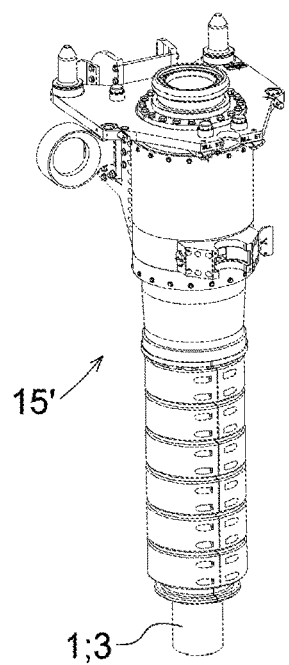
Fig. 3A    Fig. 3B

METHOD FOR SUBSEA DEPLOYMENT OF DISCRETE LENGTHS OF FLEXIBLE JUMPER PIPES

TECHNICAL FIELD OF THE INVENTION

The present invention relates to subsea installation of flexible jumper pipes, and more specifically to a method for deployment of discrete lengths of flexible jumper pipes from a surface vessel or platform.

BACKGROUND AND PRIOR ART

Flexible jumper pipes or just flexible jumpers can be used to interconnect subsea structures such as valve trees, pipelines, manifolds and risers, etc. A flexible jumper typically consists of a flexible pipe between two end-fittings usually of a standardized design that permits a sealed lock with a mating connector of a subsea component. The flexible jumpers are typically multi-layered structures including at least one or more fluid barrier layers, pressure and tensile load resistant layers and wear resistant layers, for example. The flexibility of the jumper provides a connection that permits some freedom of movement for at least one of the connected parts.

Since flexible jumpers are provided at discrete lengths for installation subsea they are usually individually stored on a vessel for transport to a deployment site. The jumpers are then fed through a laying system with tensioners and lowered one by one into the sea using crane wires attached to both ends of the jumper, in a time-consuming process that often involves both the transportation vessel and a laying-out vessel.

SUMMARY OF THE INVENTION

An aspect of the present invention is to provide an improved method for individual deployment of discrete lengths of flexible jumper pipes for interconnection of subsea structures in a subsea installation.

An aspect of the present invention is a method comprising:
coupling the jumper pipes together end-to-end thus forming a flexible train of jumper pipes,
winding the train of jumper pipes on a drum suitable for transport to a deployment site by a pipe-laying vessel,
unreeling the train of jumper pipes from the drum until the first jumper pipe is lowered into the sea, then halting the drum,
hanging off/detaching the trailing end of the first jumper pipe from the leading end of the second jumper pipe in the train of jumper pipes,
shifting the trailing end of the first jumper pipe to a lowering wire, and lowering the first jumper pipe to the sea bottom, and
repeating the previous steps until the discrete lengths of flexible jumper pipes are individually lowered into the sea.

In prior art methods individual jumper pipes are lowered separately and completely independent of each other. In one exemplary aspect of the present method, the leading jumper pipe will lead the next tailing and connected jumper pipes through the lay system towards the final position before being lowered into the sea. In that way both the leading and the tailing pipes are drawn through the lay system in a continuous process. As the individual jumpers are connected to each other prior to detachment and lowering, it is only necessary to thread the leading end of the first jumper pipe through the lay system as the further jumpers will inherently follow when the jumpers are connected. This provides a substantial simplification to the process of lowering individual jumpers into the sea, as each jumper pipe previously has been lifted through the lay system independently.

In one embodiment the method includes feeding the train of jumper pipes in a path towards a working platform, wherein the detached trailing end of the first jumper pipe is arrested above the platform while installing an end termination assembly thereto.

By feeding the jumper pipe through a feed path, it is ensured that the operators maintain control with the leading jumper pipe. As the jumper pipes are interconnected before detachment and lowering of the leading pipe, there will constantly be at least one jumper in the feed path.

In one embodiment the detached leading end of the second jumper pipe is momentarily parked at the side of the feed path while an end termination assembly is installed in the trailing end of the first jumper pipe.

By this parking step, the jumper pipe is maintained in position until an end termination assembly is mounted on the end sections of each jumper.

In some embodiments, the feed path for feeding the train of jumper pipes towards the working platform is vertical, near-vertical or even inclined or slanted.

When the feed path is vertical, near-vertical or slanted, the disconnected jumper pipe can easily be lowered into the sea independently of the length of the jumper pipes, as the detachment and preparation steps for the jumper pipes are mainly the same for all jumper pipe lengths.

One embodiment comprises halting the feed of the train of jumper pipes while installing end termination assemblies in the leading ends respectively of the discrete jumper pipes before lowering into the sea.

When the feed is halted, each jumper pipe can be provided with end termination assemblies for further connection to subsea structures on the sea bed.

One embodiment of a method of the present invention is implemented using a working platform that is a structural part of a J-Lay ramp or a VLS (Vertical Landing System)-tower, wherein feeding the train of jumper pipes comprises intermittent drive of top and bottom tensioners arranged on this ramp or tower.

As the methods of the present invention can be used with existing lay systems, it will not incur extra costs for specific structures or equipment to apply the present method.

More specifically the top and bottom tensioners are alternatingly operated in feeding/closed and non-feeding/open modes to permit the feed of end-fittings through the tensioners.

The tensioners will let the jumper pipes be moved towards the disconnection area where the jumper pipes are disconnected, end fittings are connected to the pipe ends before the detached first jumper pipe is lowered into the sea and the second jumper pipe is approaching the position between the tensioners from which it is prepared for being lowered.

In one embodiment the step of parking the detached leading end of the second jumper pipe at the side of the vertical, near-vertical or slanted feed path includes shifting said leading end to the end of a wire of a pulling winch on the working platform. This winch may be the same winch that initially pulls the train of jumpers off the drum, until the first jumper is engaged by the tensioners of the ramp or the VLS tower.

When the leading end of the second jumper pipe is shifted away from the first jumper, there is an increased working space around the first jumper pipe for mounting of the end section assembly.

For the purpose of forming the flexible train of jumper pipes the jumper pipes are coupled together end to end by fixation of end-fittings in a split clamp with a male/female adapter insert installed between the end-fittings.

The use of a split clamp with male/female adapter to connect the jumper pipes to each other, provides a safe temporary connection between the jumpers.

One method of the present invention is implemented on a working platform comprising an adjustable opening which can be closed around the jumper pipe for arresting the trailing end of the jumper pipe above the platform.

When the trailing end is arrested above the platform, it simplifies the process of attaching the end section assembly on the trailing end of the jumper pipe.

SHORT DESCRIPTION OF THE DRAWINGS

Aspects of the invention will be further explained below with reference made to the accompanying schematic drawings that illustrate embodiment examples of the invention. In the drawings, FIGS. 1A-1F show successive steps in the process of deployment of discrete lengths of flexible jumper pipes from a surface vessel;

FIGS. 2A-2B show an end-to-end coupling of flexible jumper pipes in connected and disconnected modes respectively; and FIGS. 3A-3B show end termination components installed on the leading and trailing ends respectively of a flexible jumper pipe.

DETAILED DESCRIPTION

One feature in the process of subsea deployment of flexible jumper pipes according to aspects of the present invention is the connection end-to-end of discrete lengths of jumper pipes. The jumper pipes can be of different lengths or may have the same length. Interconnected they form a flexible train of jumper pipes, wherein for the purpose of description a leading jumper pipe, as seen in a feed direction, will be named the first jumper pipe whereas the following jumper pipe will be named the second jumper pipe regardless of their location in the train of jumper pipes. In other words, the first jumper is the jumper either in process of being lowered into the water or being prepared for lowering. The second jumper is the jumper following the first jumper and thereby being either still partly on the reel or between the reel and the jumper being lowered into the sea. In interconnected mode, the trailing end of the first jumper pipe is coupled to the leading end of the second jumper pipe. In that way, the leading end of the second jumper pipe is lifted into and through the lay system by means of the first jumper pipe.

The coupling together of the first and second jumper pipes is illustrated in FIGS. 2A and 2B. The jumper pipe lengths comprise in each end an end-fitting which is adapted for connecting the flexible jumper to a subsea facility. Thus, with reference to the drawing of FIG. 2A, the first jumper pipe 1 carries in its trailing end an end-fitting 2 which is coupled to a meeting end-fitting 2' in the leading end of the second jumper pipe 3. Coupling together the end-fittings 2 and 2' is accomplished by means of a split clamp 4 comprising two half-circular parts which are bolted together to form a grip behind flanges 5 that are formed in the ends of the end-fittings 2 and 2'. A male/female adapter insert 6 is installed to locate the end-fittings and to protect the end surfaces of the end-fittings 2 and 2' in coupled mode. The coupling can be equipped with seals to allow pressure testing of the complete train of jumper pipes before detaching the jumper pipes one by one for lowering each jumper subsequently down onto the seabed.

In coupled mode the jumper pipes form a flexible train which can be reeled up on a drum 7 as illustrated in FIGS. 1A-1F. The drum or reel 7 is carried by a pipe-laying vessel to the site of deployment of the flexible jumpers. The vessel is not shown in the schematic drawings, but persons skilled in the art will realize that among suitable vessels are those that permit lowering of the jumper pipes from a working platform 8, such as vertical, near vertical, inclined or slanted lowering by means of a J-lay or a Reel-lay vessel, for example. To this purpose the vessel would carry a J-ramp or a VLS (Vertical Landing System)-tower 9 that permits personnel to operate on the working platform 8.

In the following disclosure, the procedure of subsea deployment of flexible jumper pipes includes gradually or stepwise unreeling the train of jumper pipes from the drum, separation of the leading jumper pipe from the train of jumper pipes and lowering of each jumper pipe individually into the sea using the VLS-tower 9 illustrated in the drawings.

An initial step of the deployment procedure is shown in FIG. 1A, wherein a pulling wire 10 of a winch 11 is attached to the leading end of the first jumper pipe 1 and driven for pulling the first jumper into the gutter of a sheave 12 that is arranged in the top of the VLS-tower 9. During this pulling manoeuvre the upper set of endless-belt tensioners 13 is opened to allow passage of the end-fitting 2' in the leading end of the jumper pipe.

Figure 1B:
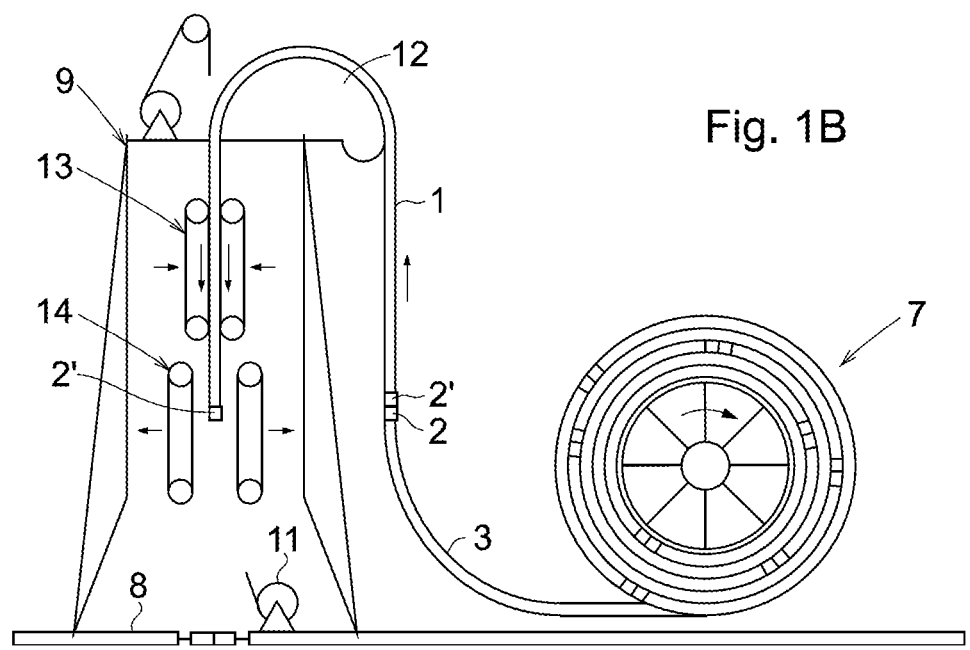

The winch 11 is operated until the end-fitting 2' has passed the upper set of tensioners 13, upon which these are tightened about the jumper pipe for feeding the same in a path towards the working platform 8, such as a vertical or near vertical path as illustrated in FIG. 1B. At this stage the lower set of endless-belt tensioners 14 is opened to allow passage of the end-fitting 2' in the leading end of the jumper pipe 1.

Figure 1C:
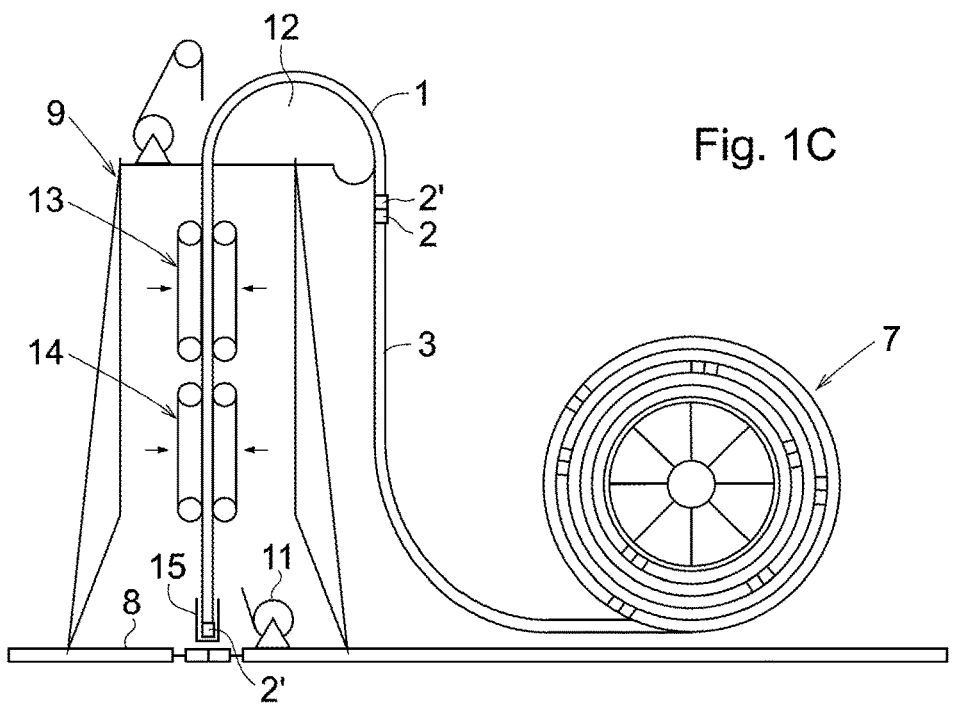

Once the end-fitting 2' in the leading end of jumper pipe 1 has passed the lower set of tensioners 14, these can be tightened about the jumper pipe to support the feed of the jumper pipe into the position illustrated in FIG. 1C. In the sequence shown in FIG. 1C the feed is stopped and the jumper pipe is halted with its leading end located on the working platform 8. In this position the jumper pipe is manually fitted with an end termination assembly 15 that is mounted over the end-fitting 2'.

The end termination 15 can be a known type assembly as illustrated in FIG. 3A, comprising bend stiffeners and coupling interface for mating with a subsea facility such as a pipeline, a manifold, riser or tree, etc. In a later sequence of the deployment process a corresponding end termination assembly 15' as illustrated in FIG. 3B will be mounted over the end-fitting 2 in the trailing end of the jumper pipe.

Figure 1D:
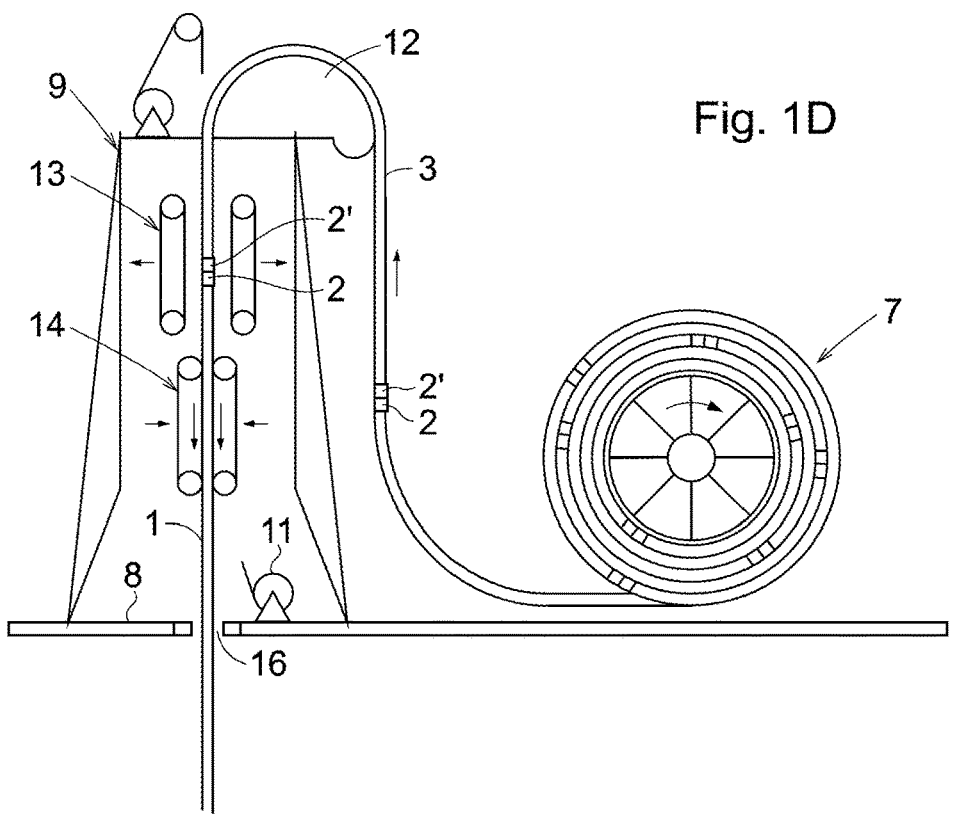
Figure 1E:
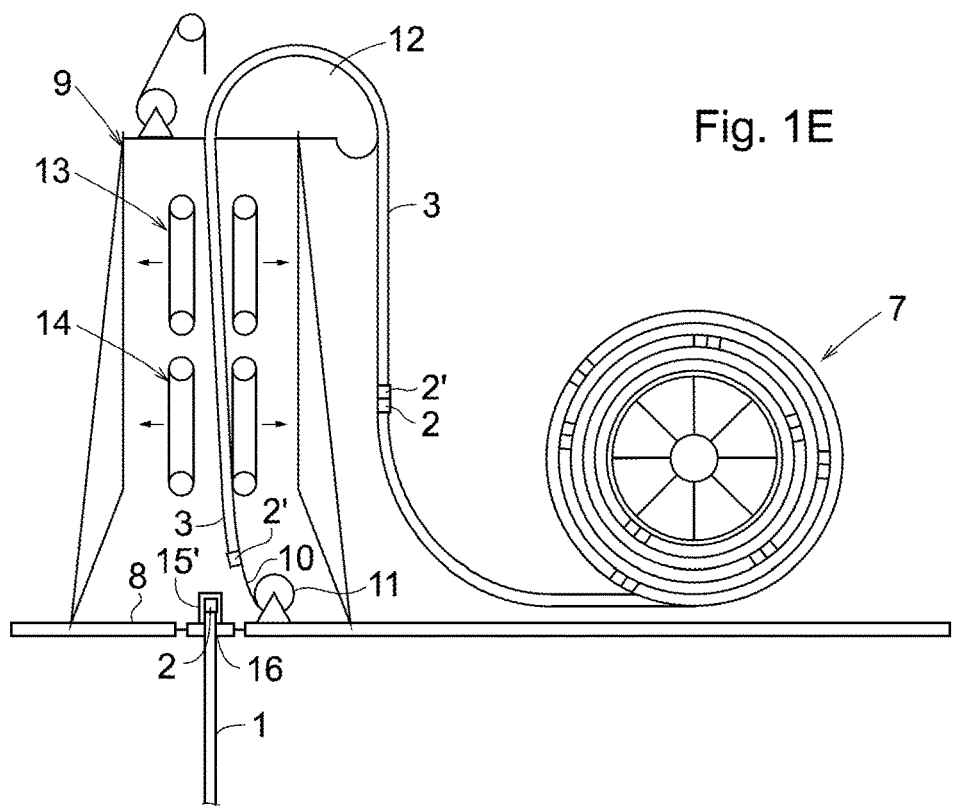
Figure 1F:
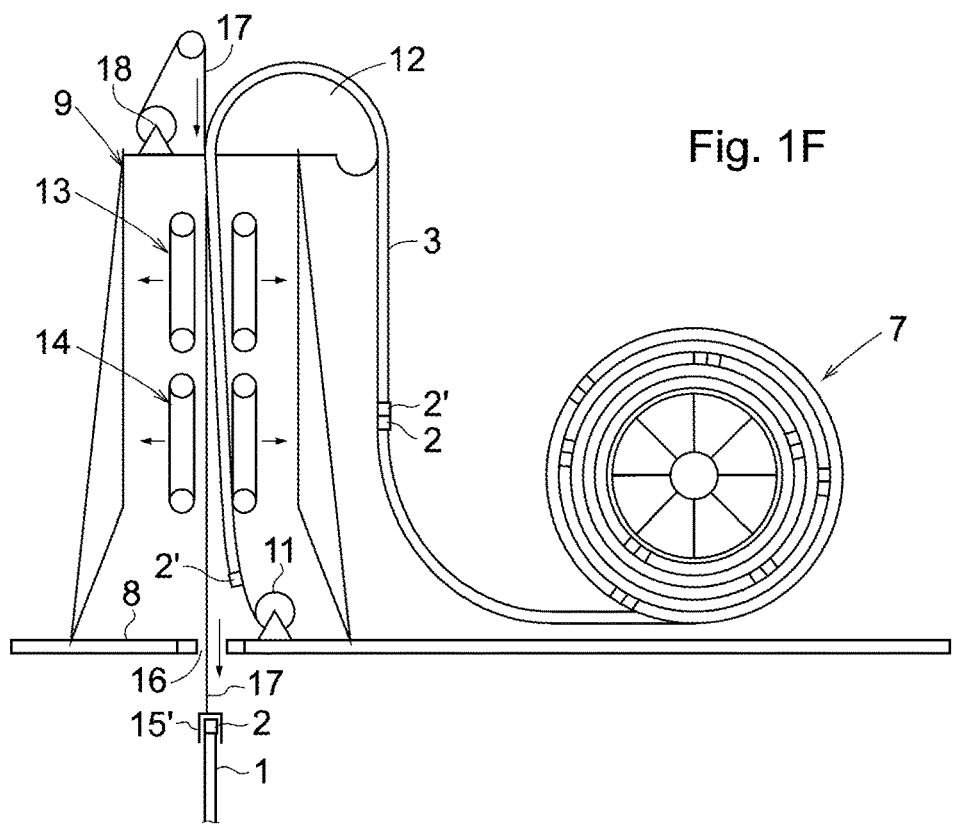

In the next sequence, see FIG. 1D, the lower tensioner 14 is operated to feed the first jumper pipe 1 into the sea via an adjustable opening 16 arranged in the working platform. As the trailing end of the first jumper pipe 1 descends through the VLS-tower the upper and lower sets of tensioners 13 and 14 are operated intermittently and alternatingly opened in sequence to allow for passage of the interconnected end-fittings 2 and 2' between the jumper pipes 1 and 3, as illustrated in FIGS. 1D and 1E respectively.

When the first or outermost jumper pipe 1 has been lowered to an extent wherein the trailing end reaches the working platform the feed is halted, and the adjustable opening 16 is closed about the jumper pipe. In this halted position the trailing end of the first jumper pipe 1 is detached from the leading end of the second jumper pipe 3. In the shown embodiment, this is done by opening the split clamp 4 and separating the subject end-fittings 2 and 2'. The winch wire 10 is attached to the leading end of the second jumper pipe 3 and the winch 11 is operated to move the second jumper pipe 3 away from the feed path. An end termination assembly 15' is then mounted over the end-fitting 2 in the trailing end of the first jumper pipe 1.

Now the first jumper pipe 1 is separated from the train of jumper pipes and is properly terminated in both ends for subsequently serving as connection between two subsea facilities. The first jumper pipe 1 can then be lowered into the sea by means of a wire 17 being connected to the trailing end section of the jumper pipe. The wire 17 is operated from a winch 18 in the VLS tower (see FIG. 1F). The steps of FIGS. 1C to 1F can then be repeated in sequence until the entire train of jumper pipes on the reel 7 is split into discrete lengths which are lowered individually into the sea at the site of deployment and installation.

It should be noted that the jumper pipes could also be lowered by other equipment than the shown embodiment, where the jumpers are tilted, angled or lying when they are disconnected. The jumpers can also be lowered e.g. tilted on an inclined ramp arrangement or lowered by a more lying position into the sea.

For some applications a wire can be attached to each end section of an angled or lying disconnected jumper before lowering the jumper pipe into the sea as described above. This would for example be relevant when using the method in deep water applications.

The invention is therefore not in any way restricted to the embodiments described above. On the contrary, many possibilities to modifications thereof will be apparent to a person with ordinary skill in the art without departing from the basic idea of the invention such as defined in the appended claims.

The invention claimed is:

1. A method for deployment of discrete lengths of flexible jumper pipes for installation subsea comprising:
   coupling the jumper pipes together end-to-end thus forming a flexible train of jumper pipes;
   winding the train of jumper pipes on a drum suitable for transport to a deployment site by a pipe-laying vessel;
   unreeling the train of jumper pipes from the drum until the first jumper pipe is lowered into the sea, then halting the drum;
   detaching the trailing end of the first jumper pipe from the leading end of the second jumper pipe in the train of jumper pipes;
   shifting the trailing end of the first jumper pipe to a lowering wire; lowering the first jumper pipe to the sea bottom; and
   repeating the previous steps until the discrete lengths of flexible jumper pipes are individually lowered into the sea.

2. The method of claim 1, wherein unreeling includes feeding the train of jumper pipes in a path towards a working platform, the method further comprising:
   arresting the detached trailing end of the first jumper pipe above the platform while installing an end termination assembly thereto.

3. The method of claim 1, wherein the train of jumper pipes are fed in a vertical, near-vertical or slanted path towards the working platform.

4. The method of claim 1, comprising:
   parking the detached leading end of the second jumper pipe at the side of the vertical or near-vertical feed path while installing an end termination assembly in the trailing end of the first jumper pipe.

5. The method of claim 1, comprising halting the feed of the train of jumper pipes while installing end termination assemblies in the leading ends of the discrete jumper pipes before lowering into the sea.

6. The method of claim 1, wherein the working platform is a structural part of a J-Lay ramp or a VLS (Vertical Landing System) tower, and feeding the train of jumper pipes comprises intermittent drive of top and bottom tensioners on the ramp or tower.

7. The method of claim 6, wherein the top and bottom tensioners are alternatingly operated in feeding/closed and non-feeding/open modes to permit the feed of end-fittings through the tensioners.

8. The method of claim 1, wherein parking the detached leading end of the second jumper pipe at the side of the vertical, near-vertical or slanted feed path comprises shifting said leading end to the end of a wire of a pulling winch on the working platform.

9. The method of claim 1, wherein coupling the jumper pipes together end to end comprises fixation of end-fittings in a split clamp with a male/female adapter insert installed between the end-fittings.

10. The method of claim 1, wherein arresting the trailing end of the jumper pipe above the platform comprises closing an adjustable opening through the working platform around the jumper pipe.

* * * * *